US011734380B2

(12) United States Patent
Martinez Caudillo et al.

(10) Patent No.: US 11,734,380 B2
(45) Date of Patent: Aug. 22, 2023

(54) SYSTEMS AND METHODS FOR DECOUPLING WEBSITE COMPOSITION, LAYOUT, AND PROCESSING (71) Applicant: JPMORGAN CHASE BANK, N.A., New York, NY (US)

(72) Inventors: Jesus Martinez Caudillo, Newark, DE (US); Joseph Certesio, New York, NY (US); Sterling M Vaughan, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 0 days.

(21) Appl. No.: 17/455,801

(22) Filed: Nov. 19, 2021

(65) Prior Publication Data

US 2023/0161833 A1    May 25, 2023

(51) Int. Cl.
*G06F 16/957* (2019.01)
*G06F 16/958* (2019.01)
*G06F 17/00* (2019.01)
*G06Q 10/109* (2023.01)
*G06F 16/955* (2019.01)

(52) U.S. Cl.
CPC ........ *G06F 16/9577* (2019.01); *G06F 16/958* (2019.01); *G06F 16/9566* (2019.01); *G06Q 10/109* (2013.01)

(58) Field of Classification Search
CPC ............... G06F 16/9577; G06F 16/958; G06F 16/9566; G06Q 10/109
USPC .......................................................... 715/234
See application file for complete search history.

(56) References Cited

U.S. PATENT DOCUMENTS

| | | | |
|---|---|---|---|
| 7,010,530 B2* | 3/2006 | Bartkowiak | G06Q 10/06 707/999.009 |
| 8,930,820 B1* | 1/2015 | Elwell | G06Q 10/109 715/963 |
| 9,257,014 B1* | 2/2016 | Allen | G07F 17/3258 |
| 11,361,047 B2* | 6/2022 | Dickerson | G06F 3/0481 |
| 2002/0156787 A1* | 10/2002 | Jameson | G06Q 10/109 |
| 2007/0136279 A1* | 6/2007 | Zhou | G06F 16/9566 707/E17.115 |
| 2009/0012895 A1* | 1/2009 | Mehrabi | G06Q 10/10 705/1.1 |
| 2010/0235411 A1* | 9/2010 | Bray | G06F 16/958 707/812 |
| 2011/0258125 A1* | 10/2011 | Iyer | G06Q 10/10 705/14.5 |

(Continued)

*Primary Examiner* — Manglesh M Patel
(74) *Attorney, Agent, or Firm* — Greenberg Traurig LLP (57) ABSTRACT Systems and methods for generating a website having a decoupled composition, layout, and processing are disclosed. A method may include an event creator computer program: (1) creating an event having a plurality of attendees; (2) creating a plurality of attendee types for the plurality of attendees; (3) generating a communication template for each of the plurality of attendee types; (4) receiving an event specific welcome page for each of the plurality of attendee types; (5) receiving a website configuration file for each of the plurality of the attendee types; and (6) uploading the event specific welcome page and the website configuration file for each attendee type to a library, wherein a web site host computer program links one of the plurality of welcome pages and the website configuration file to each of the attendee types.

18 Claims, 3 Drawing Sheets

(56) References Cited

U.S. PATENT DOCUMENTS

| | | | |
|---|---|---|---|
| 2013/0055071 A1* | 2/2013 | Bray | G06F 16/958 715/234 |
| 2014/0075284 A1* | 3/2014 | Logtenberg | G06Q 10/1093 715/234 |
| 2014/0214522 A1* | 7/2014 | Skollar | G06Q 50/01 705/14.66 |
| 2014/0236808 A1* | 8/2014 | Bilynsky | G06Q 50/01 709/204 |
| 2014/0282080 A1* | 9/2014 | Garner | H04L 51/52 715/752 |
| 2015/0262262 A1* | 9/2015 | Carvajal | G06Q 30/0279 705/26.1 |
| 2015/0332350 A1* | 11/2015 | Gauss | G06F 16/9558 705/14.72 |
| 2016/0055559 A1* | 2/2016 | Heck | G06Q 30/0641 705/26.5 |
| 2016/0191653 A1* | 6/2016 | Aluotto | G06Q 50/01 709/205 |
| 2019/0228104 A1* | 7/2019 | Dickerson | G06F 40/186 |

* cited by examiner

SYSTEMS AND METHODS FOR DECOUPLING WEBSITE COMPOSITION, LAYOUT, AND PROCESSING

BACKGROUND OF THE INVENTION

1. Field of the Invention

Embodiments relate generally to systems and methods for decoupling website composition, layout, and processing.

2. Description of the Related Art

Technologies such as static Hypertext Markup Language (HTML) content, Cascading Style Sheet (CSS) files, third party JavaScript (JS) libraries, etc. tightly couple the content and organization, such as the page layout, of a webpage. Technology and risk considerations prohibit things like custom JavaScript and external libraries from being included in a webpage. Publishing simple customized HTML content is challenging due to security constraints that require such content to be uploaded only though the standard deploy pipeline.

SUMMARY OF THE INVENTION

Systems and methods for decoupling website composition, layout, and processing are disclosed. For example, embodiments may include steps to be processed by the deployment process until it reaches its production stage. When new content is to be uploaded, it starts a complex journey until it reaches the production milestone. Embodiments implement dynamic HTML and CSS content that is uploaded to the server and rendered instantly while still being in compliance with an entity's regulations.

According to one embodiment, a method for generating a website having a decoupled composition, layout, and processing may include: (1) creating, by an event creator computer program, an event having a plurality of attendees; (2) creating, by the event creator computer program, a plurality of attendee types for the plurality of attendees; (3) generating, by the event creator computer program, a communication template for each of the plurality of attendee types; (4) receiving, by the event creator computer program, an event specific welcome page for each of the plurality of attendee types; (5) receiving, by the event creator computer program, a website configuration file for each of the plurality of the attendee types; and (6) uploading, by the event creator computer program, the event specific welcome page and the website configuration file for each attendee type to a library, wherein a website host computer program links one of the plurality of welcome pages and the website configuration file to each of the attendee types.

In one embodiment, the communication template may include an email communication template.

In one embodiment, the website configuration files may specify a plurality of fields to include and/or controls to be applied.

In one embodiment, the website configuration files may be JSON files.

In one embodiment, each of the event specific welcome pages and the website configuration files may be associated with a form start date and/or a form end date.

In one embodiment, the method may further include generating, by the event creator computer program, a hash of an event identifier for the event, a hash of the attendee type, and a hash of an attendee; generating, by the event creator computer program, a uniform resource locator (URL) comprising the hash of the event identifier, the hash of the attendee type, and the hash of the attendee; and communicating, to the attendee using the communication template, an invitation comprising the URL.

According to another embodiment, a method for serving a website having a decoupled composition, layout, and processing may include: (1) receiving, at a website host computer program, access from an attendee using an electronic device; (2) identifying, by the website host computer program, an attendee type for the attendee; (3) retrieving, by the website host computer program, a mapped welcome webpage and a mapped website configuration file for the attendee type; (4) presenting, by the website host computer program, the mapped welcome webpage; (5) identifying, by the website host computer program, dynamic content to present to the attendee using the mapped website configuration file; (6) retrieving, by the website host computer program, the dynamic content from a source; and (7) presenting, by the website host computer program, the content to the attendee using a template in the mapped website configuration file.

In one embodiment, the access may be received at a URL, and the URL may include a hash of an identifier for the event, a hash of the attendee type, and a hash of an identifier for the attendee.

In one embodiment, the website host computer program may identify the attendee type using the hash of the attendee type.

In one embodiment, the mapped website configuration file may specify a plurality of fields to include and/or controls to be applied.

In one embodiment, the mapped website configuration file may be a JSON file.

In one embodiment, the website host computer program may identify the event identifier for the mapped website configuration file based on the hash of the event identifier.

According to another embodiment, a method for notifying an attendee of a registration status for an event may include: (1) receiving, at a website host computer program, access from an attendee using an electronic device, the access received at a URL comprising a hash of an event identifier, a hash of an attendee identifier, and a hash of an attendee type; (2) identifying, by the website host computer program, the attendee type out of a plurality of attendee types for the attendee from the hash of the attendee type; (3) determining, by the website host computer program, that the attendee has completed registration for an event associated with the event identifier; (4) identifying, by the website host computer program, an attendee type for the attendee out of a plurality of attendee types using the hash of the attendee type; (5) retrieving, by the website host computer program, an email communication template for the identified attendee type; (6) retrieving, by the website host computer program, dynamic content for the identified attendee type; (7) rendering, by the website host computer program, the dynamic content into a communication using a communication template; and (8) sending, by the website host computer program, the communication to the attendee with a completed registration status.

In one embodiment, the communication may include an email.

In one embodiment, the website host computer program may retrieve the attendee type for the hash of the attendee type from a database.

In one embodiment, the dynamic content may include a confirmation that registration is successful for the attendee, an event schedule for the attendee, travel details for the attendee, etc.

In one embodiment, the communication template may be specific to the attendee type.

In one embodiment, the method may further include sending, by the website host computer program, a second communication to the attendee with an event update.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments relate generally to systems and methods for decoupling website composition, layout, and processing. For example, embodiments may decouple the normal process/way a web page is created on a web server. Embodiments allow for the ingestion of a configuration file that is customizable outside of the web server. The configuration file may then be consumed as page is created. The configuration file controls the layout, provides additional content and allows for significant customization. Further, this configuration file is secure in that it is essentially a text file that contains no code.

Figure 1:
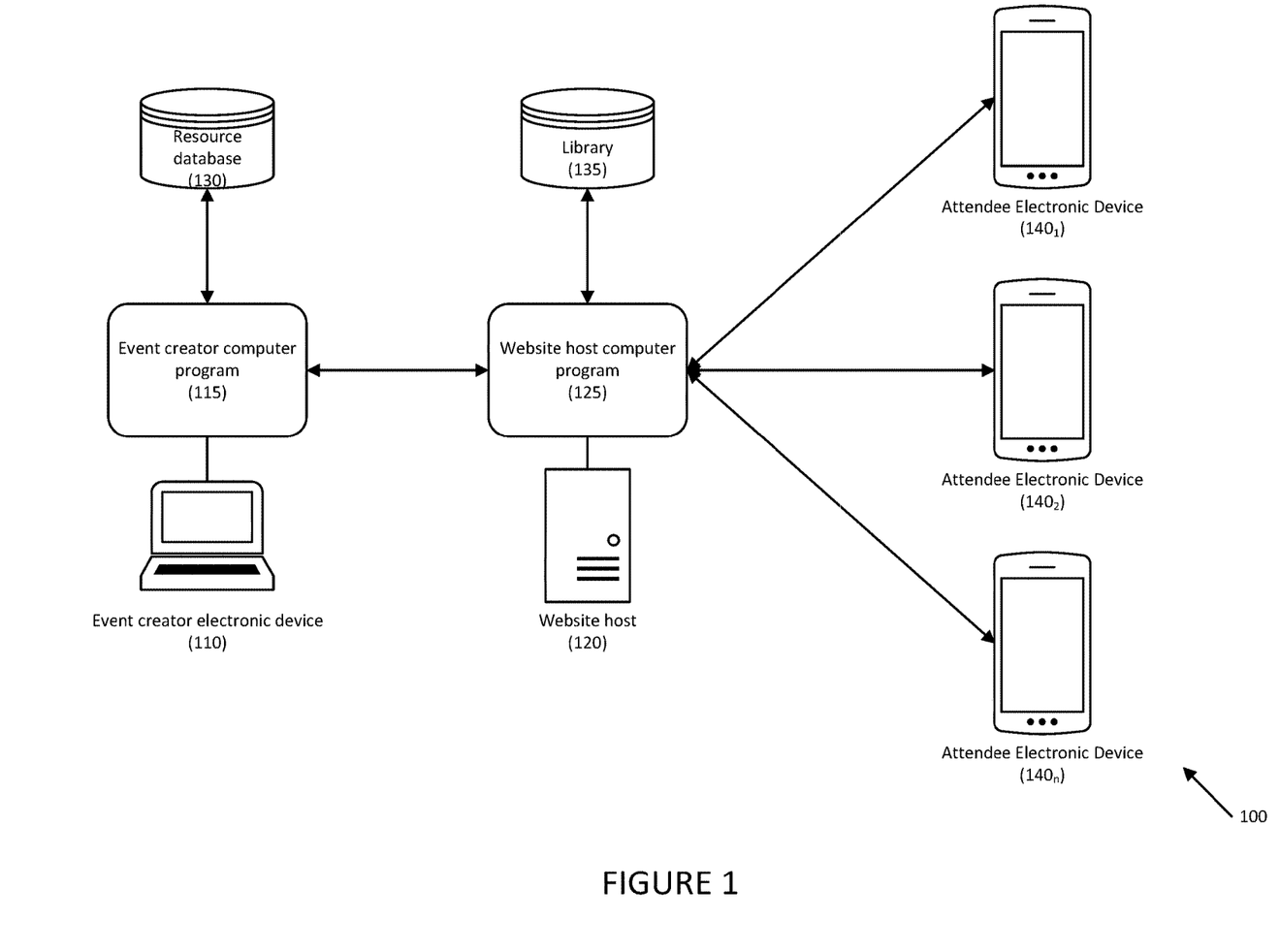
FIG. 1 is a depicts a system for decoupling website composition, layout and processing according to an embodiment.

Referring to FIG. 1, a system for decoupling web site composition, layout, and processing is provided according to an embodiment. System 100 may manage any kind of events, including events that are internal to an organization and events that are external to the organization. Attendees at either event receive an invitation link via email, text, etc. that will direct them to a rendered page that includes tailored html content for the attendee's specific attendee type.

System 100 may include event creator electronic device 110, which may be any suitable electronic device (e.g., computers (e.g., laptop, desktop, tablet), smart devices, Internet of Things (IoT) devices, etc.). Event creator electronic device 110 may execute event creator computer program 115 that may receive information for an event and generate a website configuration file for the event.

As used herein, a website may include one or more webpages.

In one embodiment, event creator computer program 115 may use resources from resource database 130, such as website templates, to generate the website.

System 100 may further include website host 120, which may be server, such as a physical server, a cloud-based server, combinations thereof, etc. In one embodiment, web site host 120 may execute website host computer program 125 that may generate and server webpages using, for data from library 135. In one embodiment, library 135 may store the configuration file provided by event creator computer program 115. Library 135 may store data that may be dynamically selected by website host computer program 125 for presentation users, such as attendees, on attendee device 140 (e.g., $140_1$, $140_2$, . . . $140_n$). The attendees may be attendees of an event, web site visitors, etc.

As used herein, an event may include any sort of gathering, in person or virtual, including meetings, conferences, phone calls, videocalls, video conferences, etc.

Figure 2:
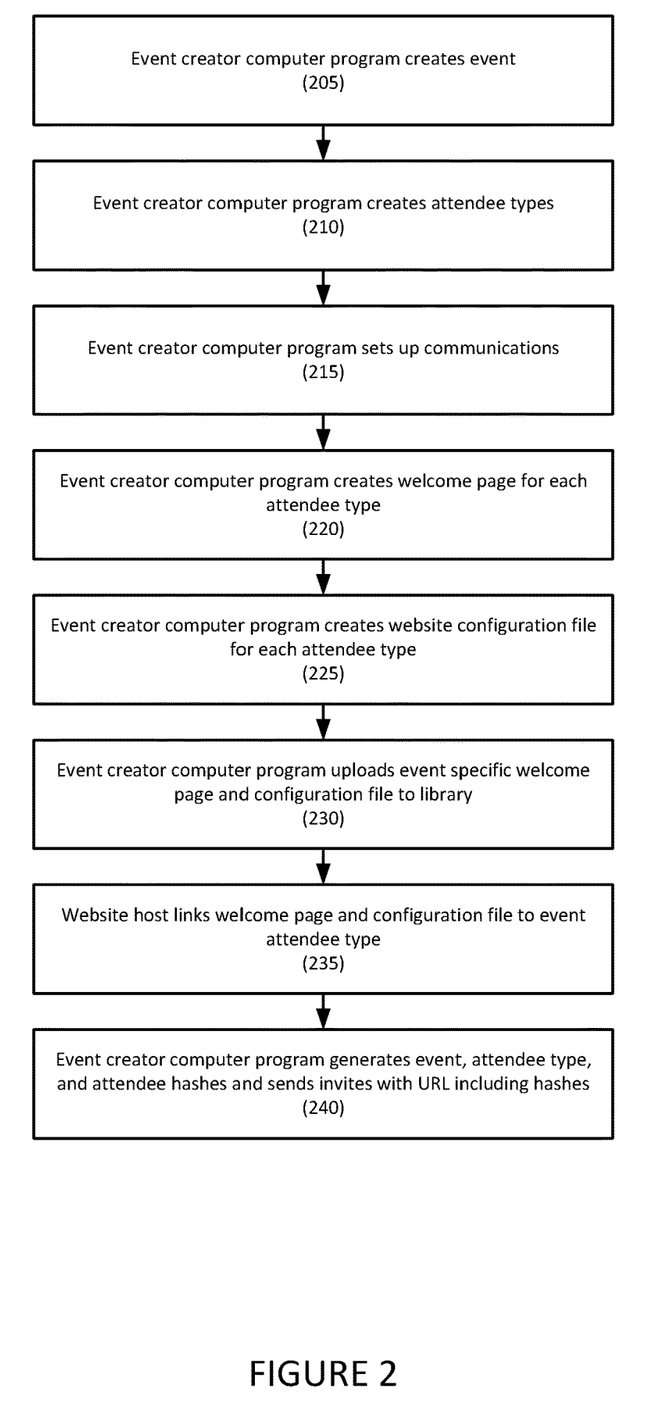
FIG. 2 depicts a method for generating a website having a decoupled composition, layout, and processing is provided according to an embodiment.

Referring to FIG. 2, a method for generating a website having a decoupled composition, layout, and processing is provided according to an embodiment.

In step 205, an event creator computer program may create an event. Any sort of event may be created. In one embodiment, the event may have a plurality of different attendee types for the event.

In step 210, the event creator computer program may create one or more attendee type for the event. For example, the attendee type may be based on a role of the attendee, events at the event that the attendee is attending, etc. The attendee type may provide the ability to specify an attendee's role at the event; for example, an attendee type may be "speaker" which may require the attendee to provide flight and accommodation information for the event, whereas an attendee type of "guest" may present a payment screen so that the attendee can pay to attend the event.

In step 215, the event creator computer program may set up communications, such as email communications, text communications, etc. For example, the event creator computer program may identify email templates, text templates, etc. to send to the attendees. In one embodiment, each attendee type may have a different communication set up.

In step 220, a welcome page mat be created for each attendee type using, for example, one or more templates for the welcome page. The welcome page may be a html page with embedded CSS. The welcome page may be generated by the event creator computer program, or it may be created by a separate computer program. The welcome page may be generated using an integrated development environment (IDE) or html editor.

In step 225, a website configuration file may be generated for each attendee type. For example, the event creator computer program or a separate computer program may create a file that may be accessed by the website host computer program and processed as part of the form creation process. The website configuration file may allow for configuration of which fields to include, the order of inclusion, the type of control to use, etc.

In embodiments, the event creator computer program may define mandatory fields for certain attendee types. For example, the attendee type of "speaker" may be required to enter contact information for an assistant, whereas as attendee type of "speaker companion" may be required to enter a relationship to a speaker.

In one embodiment, the website configuration file may be JSON file, and may be text based and not include code. For example, each attendee type may have its own JSON file, each of which may include a defined image banner, mapping fields, warning messages, etc.

In one embodiment, a configuration file may include a website branding URL, a website banner URL, custom messages (e.g., registration is closed, privacy messages, etc.). The configuration file may also include an attendee identifier, attendee name, etc.

In step 230, the event creator computer program may upload the event specific welcome page and the configuration file for each attendee type to a library. For example, as part of the upload process, the event creator computer program may identify an event name, an event identifier, etc. In one embodiment, the event specific welcome page may be uploaded separately.

In step 235, a website host computer program may link the welcome page and the configuration file to at least one event attendee type. For example, for each attendee type, the website host computer program may specify the welcome page and the website configuration file. In one embodiment, a form end date and end time may be specified.

In step 240, the event creator computer program may generate a hash for the event identifier, a hash for the attendee type, and a hash for each attendee, and may send the invitation to each attendee with the URL. The URL may include the hashes.

In one embodiment, the hashes may be stored in one or more databases.

In embodiments, there may be two types event registration types—open and closed registration. Open registration requires the attendee to provide the event identifier and the and attendee type to the website host computer program in order to register for the event. With closed registration, only one valid link may be provided to the attendee, and that link may only be used once. For example, a first parameter of the link may map to the event, a second parameter may map to the attendee type, and a third may map to an attendee. An illustrative example link is: http://localhost/registration/ 1bcef5d8bd566084523bf65b7e1a245d/4edb2dc808 89b1aec708ec4730f22387/ dc9882a51f6ff39f5627c88f9ed6c2bb.

Figure 3:
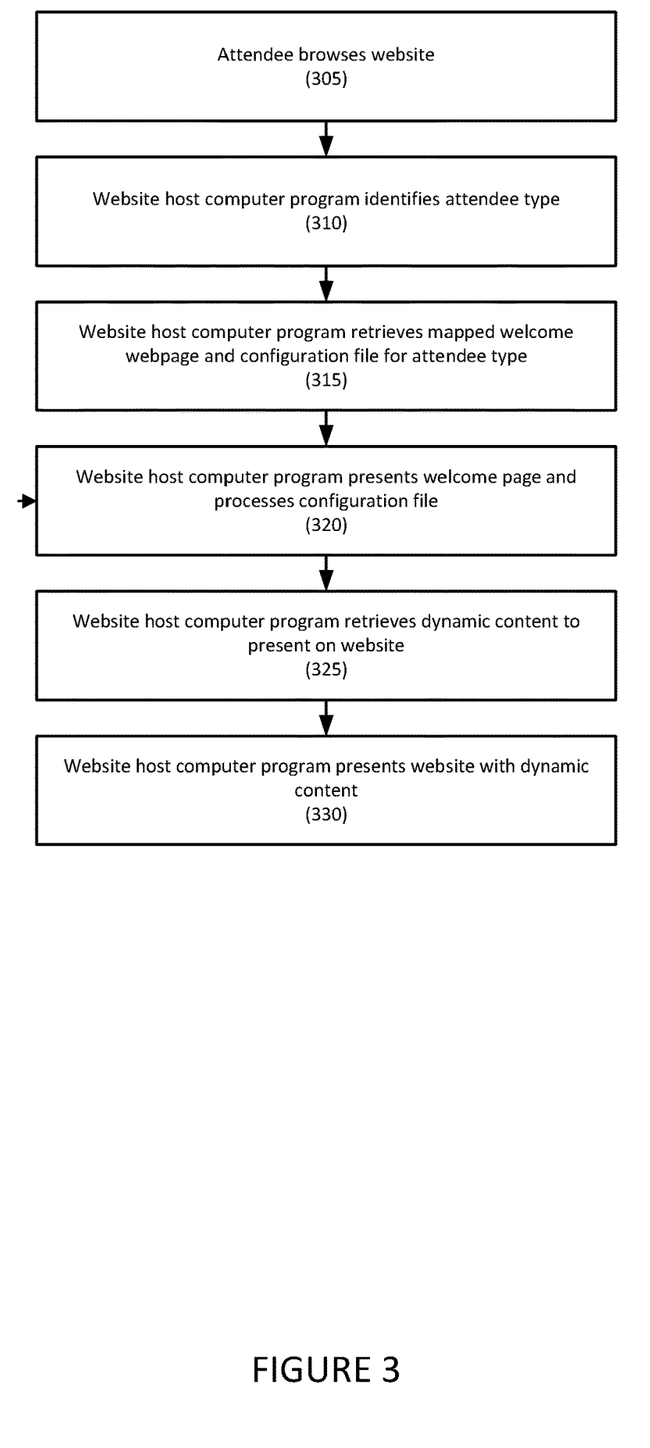
FIG. 3 depicts a method for serving a website having a decoupled composition, layout, and processing is provided according to an embodiment.

Referring to FIG. 3, a method for serving a website having a decoupled composition, layout, and processing is provided according to an embodiment.

In step 305, an attendee may access a website. In one embodiment, the attendee may be provided with a link to the website in an invitation. The URL may include parameters, such as hashes for the event, the attendee type, and the attendee. The URL may render the registration page with attendee's details pre-prepopulated.

In step 310, the website host computer program may identify the event, the attendee type, and the attendee by reading URL parameters passed as hashes. Using the event parameter, the website host computer program may retrieve event details, such as the name of the event, description of the event, start/end dates, etc. The website host computer program may retrieve attendee type and attendee information using the hashes.

In step 315 the website host computer program may retrieve the mapped welcome webpage and configuration file for the attendee type.

In step 320, the website host computer program may dynamically present the welcome page and may process the website configuration file to identify content to present to the attendee. For example, the website host computer program knows the attendee type that maps to the configuration file, whether registration is still open, the welcome page to render, whether the attendee has already used the registration link, etc.

In step 325, the website host computer program may retrieve dynamic content to present to the attendee using REST APIs, direct database connections, etc. For example, the attendee type "speaker" will be presented with a different webpage than the attendee type "companion," and different dynamic content, such as required information may be required.

Other examples of dynamic content may include confirmation of s successful registration for the attendee, an event schedule for the attendee, travel/lodging details for the attendee, cancellation notices, event changes, etc. In one embodiment, the dynamic content may further include calendar invites, updates, cancellations, etc. as is necessary and/or desired.

In step 330, the website host computer program may present the website with the dynamic content to the attendee's browser.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating a website having a decoupled composition, layout, and processing, comprising:
   creating, by an event creator computer program, an event having a plurality of attendees;
   creating, by the event creator computer program, a plurality of attendee types for the plurality of attendees;
   generating, by the event creator computer program, an email communication template for each of the plurality of attendee types, the email communication template unique to each of the plurality of attendee types;
   receiving, by the event creator computer program, an event specific welcome page for each of the plurality of attendee types;
   receiving, by the event creator computer program, a website configuration file for each of the plurality of the attendee types; and
   uploading, by the event creator computer program, the event specific welcome page and the website configuration file for each attendee type to a library, wherein a website host computer program links one of the plurality of welcome pages and the website configuration file to each of the attendee types.

2. The method of claim 1, wherein the website configuration files specify a plurality of fields to include and/or controls to be applied.

3. The method of claim 1, wherein the website configuration files are JSON files.

4. The method of claim 1, wherein each of the event specific welcome pages and the website configuration files are associated with a form start date and/or a form end date.

5. The method of claim 1, further comprising:
   generating, by the event creator computer program, a hash of an event identifier for the event, a hash of the attendee type, and a hash of an attendee;
   generating, by the event creator computer program, a uniform resource locator (URL) comprising the hash of the event identifier, the hash of the attendee type, and the hash of the attendee; and
   communicating, to the attendee using the communication template, an invitation comprising the URL.

6. A method for serving a website having a decoupled composition, layout, and processing, comprising:
   sending, by a website host computer program, an email invitation to an attendee, the email invitation comprising an access invitation, wherein the email invitation is based on an email communication template for an attendee type respective of the attendee, the email communication templated unique to the attendee type;
   receiving, at the website host computer program via the access invitation, access from the attendee using an electronic device;
   identifying, by the website host computer program, the attendee type for the attendee based on the access invitation;
   retrieving, by the website host computer program, a mapped welcome webpage and a mapped website configuration file for the attendee type, each of the mapped welcome webpage and the mapped website configuration file unique to the attendee type;
   presenting, by the website host computer program, the mapped welcome webpage;
   identifying, by the website host computer program, dynamic content to present to the attendee using the mapped website configuration file;
   retrieving, by the website host computer program, the dynamic content from a source; and
   presenting, by the website host computer program, the content to the attendee using a template in the mapped website configuration file.

7. The method of claim 6, wherein the access is received at a URL, and the URL comprises a hash of an event identifier for the event, a hash of the attendee type, and a hash of an identifier for the attendee.

8. The method of claim 7, wherein the website host computer program identifies the attendee type using the hash of the attendee type.

9. The method of claim 7, wherein the website host computer program identifies the event identifier for the mapped website configuration file based on the hash of the event identifier.

10. The method of claim 6, wherein the mapped website configuration file specifies a plurality of fields to include and/or controls to be applied.

11. The method of claim 6, wherein the mapped website configuration file is a JSON file.

12. A method for notifying an attendee of a registration status for an event, comprising:
   receiving, at a website host computer program, access from an attendee using an electronic device, the access received at a URL comprising a hash of an event identifier, a hash of an attendee identifier, and a hash of an attendee type;
   identifying, by the website host computer program, the attendee type out of a plurality of attendee types for the attendee from the hash of the attendee type;
   determining, by the website host computer program, that the attendee has completed registration for an event associated with the event identifier;
   identifying, by the website host computer program, an attendee type for the attendee out of a plurality of attendee types using the hash of the attendee type;
   retrieving, by the website host computer program, an email communication template for the identified attendee type, the email communication templated unique to the identified attendee type;
   retrieving, by the website host computer program, dynamic content for the identified attendee type;
   rendering, by the website host computer program, the dynamic content into a communication using a communication template; and
   sending, by the website host computer program, the communication to the attendee with a completed registration status.

13. The method of claim 12, wherein the communication comprises an email.

14. The method of claim 12, wherein the website host computer program retrieves the attendee type for the hash of the attendee type from a database.

15. The method of claim 12, wherein the dynamic content comprises a confirmation that registration is successful for the attendee.

16. The method of claim 12, wherein the dynamic content comprises an event schedule for the attendee.

17. The method of claim 12, wherein the dynamic content comprises travel details for the attendee.

18. The method of claim 12, further comprising:
   sending, by the website host computer program, a second communication to the attendee with an event update.

* * * * *